United States Patent
Bei et al.

(10) Patent No.: US 9,762,939 B2
(45) Date of Patent: Sep. 12, 2017

(54) ENHANCED USER EXPERIENCE FOR MIRACAST DEVICES

(71) Applicant: MARVELL WORLD TRADE LTD., St. Michael (BB)

(72) Inventors: Jianwei Bei, Rockville, MD (US); Manish Kumar, Clarksburg, MD (US); Sarang Shrikrishna Wagholikar, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 184 days.

(21) Appl. No.: 14/040,051

(22) Filed: Sep. 27, 2013

(65) Prior Publication Data

US 2014/0096165 A1    Apr. 3, 2014

Related U.S. Application Data

(60) Provisional application No. 61/707,021, filed on Sep. 28, 2012, provisional application No. 61/706,998, filed on Sep. 28, 2012.

(51) Int. Cl.
*H04N 7/18* (2006.01)
*H04N 21/24* (2011.01)
(Continued)

(52) U.S. Cl.
CPC ......... *H04N 21/2404* (2013.01); *H04N 19/46* (2014.11); *H04N 19/895* (2014.11);
(Continued)

(58) Field of Classification Search
CPC ................. H04N 21/238; H04N 21/24; H04N 21/26216; H04N 21/44209; H04N 21/44245
(Continued)

(56) References Cited

U.S. PATENT DOCUMENTS 6,201,834 B1    3/2001 Zhu
7,738,391 B2    6/2010 Melpignano et al.
(Continued)

OTHER PUBLICATIONS

Stockhammer et al., "H.264/AVC Video for Wireless Transmission", IEEE Wireless Communications, Aug. 2005.
(Continued)

*Primary Examiner* — Pankaj Kumar
*Assistant Examiner* — Franklin Andramuno

(57) ABSTRACT

A method is implementable in a source device operable to provide, via a wireless channel, a video stream to a sink device for display by the sink device. The method includes receiving link quality information indicative of a condition of the wireless channel and/or performance of communications between the source device and the sink device via the wireless channel. The method also includes determining a measure of network congestion based on the link quality information, and, based on the measure of network congestion, skipping one or more, but not all, video frames of a plurality of video frames in the video stream, such that the one or more video frames are not provided to the sink device, reconfiguring a video encoder operating on the plurality of video frames, such that an output bit rate of the video encoder is changed, and/or changing a video format of the video stream.

12 Claims, 10 Drawing Sheets

(51) Int. Cl.
| | |
|---|---|
| *H04N 21/4425* | (2011.01) |
| *H04N 21/442* | (2011.01) |
| *H04N 21/238* | (2011.01) |
| *H04N 21/262* | (2011.01) |
| *H04N 21/4363* | (2011.01) |
| *H04N 19/46* | (2014.01) |
| *H04N 19/895* | (2014.01) |

(52) U.S. Cl.
CPC .......... *H04N 21/238* (2013.01); *H04N 21/24* (2013.01); *H04N 21/26216* (2013.01); *H04N 21/43637* (2013.01); *H04N 21/4425* (2013.01); *H04N 21/44209* (2013.01); *H04N 21/44245* (2013.01)

(58) Field of Classification Search
USPC .............................................. 725/81, 74, 78
See application file for complete search history.

(56) References Cited

U.S. PATENT DOCUMENTS

| | | | |
|---|---|---|---|
| 8,089,502 | B2 | 1/2012 | Krisbergh et al. |
| 2002/0146074 | A1 | 10/2002 | Ariel et al. |
| 2004/0057420 | A1* | 3/2004 | Curcio et al. ................. 370/352 |
| 2004/0071217 | A1 | 4/2004 | Lin |
| 2004/0196905 | A1 | 10/2004 | Yamane et al. |
| 2006/0078056 | A1 | 4/2006 | Kadono |
| 2006/0095944 | A1* | 5/2006 | Demircin et al. .............. 725/81 |
| 2006/0182178 | A1 | 8/2006 | Oi et al. |
| 2007/0234170 | A1 | 10/2007 | Shao et al. |
| 2007/0245387 | A1 | 10/2007 | Singh et al. |
| 2009/0058691 | A1* | 3/2009 | Koo ................................ 341/51 |
| 2009/0252227 | A1 | 10/2009 | Nepomucenoleung et al. |
| 2011/0107388 | A1 | 5/2011 | Lee et al. |
| 2011/0283014 | A1 | 11/2011 | Malik et al. |
| 2012/0002103 | A1 | 1/2012 | Shao et al. |
| 2012/0079329 | A1 | 3/2012 | Steinbach et al. |
| 2012/0257671 | A1* | 10/2012 | Brockmann ..... H04N 21/64753 375/240.02 |
| 2014/0096164 | A1 | 4/2014 | Bei et al. |

OTHER PUBLICATIONS

International Search Report and Written Opinion in Application No. PCT/US2013/062347 dated Mar. 19, 2014.

"Wi-Fi Display Technical Specification Version 1.0.0", Wi-Fi Alliance Technical Committee, Wi-Fi Display Technical Task Group, Aug. 24, 2012, 149 pages.

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Chen, "Home Network Basis: Transmission Environments and Wired/Wireless Protocols," *Prentice Hall*, pp. 1-26 (Jul. 2003).

Hiertz et al., "The IEEE 802.11 Universe," *IEEE Communications Magazine*, pp. 62-70, (Jan. 2010).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

"Wi-Fi Display Technical Specification Version 1.0.0", Wi-Fi Alliance® Technical Committee, Wi-Fi Display Technical Task Group, 149 pages (Aug. 24, 2012).

International Preliminary Report on Patentability in International Application No. PCT/US2013/062347, dated Apr. 9, 2015 (13 pages).

Invitation to Pay Fees and Partial International Search Report in International Application No. PCT/US2013/062347, dated Dec. 10, 2013 (6 pages).

Office Action in U.S. Appl. No. 14/040,045, dated Mar. 18, 2015 (9 pages).

Office Action in U.S. Appl. No. 14/040,045, dated Sep. 2, 2015 (12 pages).

Office Action in U.S. Appl. No. 14/040,045, dated May 10, 2016 (12 pages).

Office Action in U.S. Appl. No. 14/040,045, dated Sep. 9, 2016 (14 pages).

Notice of Allowance in U.S. Appl. No. 14/040,045, dated Jan. 3, 2017 (17 pages).

* cited by examiner

FIG. 3

| IP | UDP | RTP | ENH | TS-1 | TS-2 | TS-3 | TS-4 | TS-5 | TS-6 | TS-7 |
|---|---|---|---|---|---|---|---|---|---|---|
| 130 | 126 | 124 | 132 | 122-1 | 122-2 | 122-3 | 122-4 | 122-5 | 122-6 | 122-7 |

120

ENHANCED USER EXPERIENCE FOR MIRACAST DEVICES

CROSS-REFERENCES TO RELATED APPLICATIONS

This claims the benefit of U.S. Provisional Patent Application No. 61/707,021, entitled "Enhancement of Miracast Device Under the Packet Loss" and filed on Sep. 28, 2012, and U.S. Provisional Patent Application No. 61/706,998, entitled "Cross Layer Communication to Enhance User Experience for Miracast Devices" and filed on Sep. 28, 2012, the disclosures of which are hereby incorporated herein by reference.

FIELD OF THE DISCLOSURE

The present disclosure relates generally to communication networks and, more particularly, to display of video content from a source device at a sink device via a wireless connection.

BACKGROUND

Miracast is an interoperability program, based on the WiFi Alliance's WiFi Display (WFD) specification, that allows products to provide seamless wireless display of content, including video, audio and graphical content, across WiFi devices (i.e., IEEE 802.11-compliant devices, such as IEEE 802.11ac devices). In particular, a Miracast "source device" provides content which is displayed, via a wireless link, at a Miracast "sink device," without either device necessarily connecting to a WiFi network. By utilizing WiFi capabilities to form a direct wireless connection, the source device (e.g., a laptop, smartphone, etc.) can take advantage of better display capabilities of a sink device (e.g., a digital television, audio/video receiver, etc.) to display content that is initially stored in, or streamed to, the source device.

The rate at which raw video data must be sent for seamless display is very large. At a high-definition resolution of 1920×1080, with 60 frames per second, 8-bit depth, and a 4:2:0 chroma format, for example, the raw data is nearly 1500 megabits per second (Mbps). To transfer such a large amount of video data over the wireless connection, WFD compresses the data using H.264 video compression. In conjunction with advanced coding techniques, the H.264 video encoder can achieve better than a 100:1 compression ratio.

To achieve this high compression ratio, the H.264 video encoder utilizes both spatial and temporal compression in order to reduce redundancy in the video data. In particular, the H.264 video encoder divides a video frame into a string of "macroblocks" that each correspond to a block of 16×16 pixels within the video frame. Moreover, the H.264 video encoder generates two different types of frames (or "slices"): "I-frames" and "P-frames." Each I-frame corresponds to a first video frame in a "Group of Pictures" (GOP), where the GOP may include approximately 10 to 20 successive video frames. I-frames utilize spatial compression, with macroblocks of an I-frame utilizing other macroblocks within the same I-frame as "reference" macroblocks. That is, compressed data representing a first macroblock of an I-frame may represent differences between the first macroblock and a second macroblock of the same I-frame, rather than completely and independently describing the first macroblock. P-frames also utilize temporal compression, with macroblocks of a P-frame utilizing corresponding macroblocks of an earlier I-frame (within the same GOP as the P-frame) as reference macroblocks. That is, compressed data representing a macroblock within a P-frame may represent differences between the P-frame macroblock and the corresponding macroblock within the (earlier) I-frame, rather than completely and independently describing the P-frame macroblock.

Because the decoding of compressed video data for macroblocks is largely dependent on the successful decoding of other compressed video data for other, reference macroblocks, H.264-encoded video data is very sensitive to data corruption. This sensitivity is exacerbated by the fact that the H.264 video encoder uses variable length coding (VLC), without marking the divisions between macroblocks in the compressed video data. As a result, if a WiFi packet carrying a portion of a video frame is lost, the rest of the video frame is generally not decodable regardless of whether the corresponding video data is received correctly. In conventional WFD systems, loss or corruption of an I-frame causes a very substantial degradation of the viewer's user experience (e.g., the video may freeze or disappear at the sink device until a new I-frame of a new GOP is received), while loss or corruption of a P-frame causes bothersome artifacts that can also detract from the viewer's user experience (e.g., "blips" or "blobs" in the video that persist until a new I-frame of a new GOP is received).

Further, the source-to-sink WiFi links utilized for WFD often have a relatively high bit error rate. Because a large number of WiFi packets (e.g., more than ten WiFi packets for 1920×1080 resolution) is typically needed to send a single H.264-encoded video frame, errors in the various I-frames and P-frames are likely. While a WiFi packet may be re-transmitted if no acknowledgement is received from the sink device, the packet will be dropped by the source device if no acknowledgement is received after several re-transmissions. Moreover, WFD uses the User Datagram Protocol (UDP), which does not guarantee reliable data delivery.

The relatively poor reliability of WiFi links, combined with the high sensitivity to data corruption for H.264-encoded video data, can significantly degrade the user experience when viewing video content displayed by a Miracast sink device. Conventional "packet loss concealment" (PLC) techniques, which are implemented at the sink device, have had very limited effectiveness.

SUMMARY

In one embodiment, a method is implementable in a source device, wherein the source device is operable to provide, via a wireless channel, a video stream to a sink device for display by the sink device. The method includes receiving, in the source device, link quality information indicative of at least one of (i) a condition of the wireless channel, or (ii) performance of communications between the source device and the sink device via the wireless channel, determining, in the source device, a measure of network congestion based on the link quality information, and, based on the measure of network congestion, at least one of (i) skipping, in the source device, one or more, but not all, video frames of a plurality of video frames in the video stream, such that the one or more video frames are not provided to the sink device, (ii) reconfiguring, in the source device, a video encoder operating on the plurality of video frames, such that an output bit rate of the video encoder is changed, or (iii) changing, in the source device, a video format of the video stream.

In another embodiment, a source device is operable to provide, via a wireless channel, a video stream to a sink device for display by the sink device. The source device includes a wireless network interface configured to communicate with the sink device via the wireless channel, and a video encoder configured to encode video data of the video stream to generate compressed video data. The compressed video data is generated at an output bit rate. The source device also includes one or more application processors configured to receive, from the wireless network interface, link quality information indicative of at least one of (i) a condition of the wireless channel, or (ii) performance of communications between the source device and the sink device via the wireless channel, determine a measure of network congestion based on the link quality information, and based on the measure of network congestion, at least one of (i) skip one or more, but not all, video frames of a plurality of video frames in the video stream, such that the one or more video frames are not provided to the sink device, (ii) reconfigure a video encoder operating on the plurality of video frames, such that an output bit rate of the video encoder is changed, or (iii) change a video format of the video stream.

In another embodiment, a method is implementable in a source device, wherein the source device is operable to provide, via a wireless network, a video stream to a sink device for display by the sink device. The method includes receiving, in the source device, queue information indicative of a length of one or more queues. The one or more queues hold video data corresponding to at least a portion of the video stream. The method also includes determining, in the source device and based on the queue information, that a queue length is above a threshold length. The queue length is associated with at least one of the one or more queues. The method also includes, in response to determining that the queue length is above the threshold length, reducing a queue load by one or both of (i) causing, in the source device, some or all video data currently in at least one of the one or more queues to be dropped, and (ii) dropping, in the source device, video data not yet in any of the one or more queues.

In another embodiment, a source device is operable to provide, via a wireless network, a video stream to a sink device for display by the sink device. The source device includes a wireless network interface configured to communicate with the sink device via the wireless network. The wireless network interface includes a queuing unit associated with one or more queues, and the one or more queues hold video data corresponding to at least a portion of the video stream. The source device also includes one or more application processors configured to receive, from the wireless network interface, queue information indicative of a length of the one or more queues, and determine whether a queue length is above a threshold length. The queue length is associated with at least one of the one or more queues. The one or more application processors are also configured to, when the one or more application processors determine that the queue length is above the threshold length, reduce a queue load by one or both of (i) causing some or all video data currently in at least one of the one or more queues to be dropped, and (ii) dropping video data not yet in any of the one or more queues.

The above embodiments, and various embodiments described below, may provide one or more advantages relating to the user experience of a person viewing video displayed via a sink device. For example, degradation due to I-frame errors, which typically manifests as a period of "frozen" or blank video in conventional systems, may be ameliorated or eliminated by the disclosed systems and techniques. Additionally (or alternatively), degradation due to P-frame errors, which typically manifests as highly visible "blips" or "blobs" on the video display in conventional systems, may be ameliorated or eliminated by the disclosed systems and techniques.

BRIEF DESCRIPTION OF THE DRAWINGS

FIG. 3 is a diagram of an example WFD packet sent from the source device to the sink device in the example WFD system of FIG. 1, according to an embodiment.

DETAILED DESCRIPTION

In various embodiments described below, a communication device providing a video stream, such as a Miracast source device conforming to the WiFi Display (WFD) specification, and/or a communication device wirelessly receiving and displaying the video stream, such as a Miracast sink device conforming to the WFD specification, operate to enhance the user experience for viewers. In some embodiments, the user experience is enhanced by including, in a packet transmitted to the receiving/sink device, recovery information that allows the sink device to decode a video frame even when some video data corresponding to the video frame, and/or corresponding to an earlier video frame, has not been received correctly (e.g., due to packet loss or packet errors on the wireless link). Alternatively, in some embodiments, the user experience is enhanced by setting or adjusting the video format of the video stream based on network conditions (e.g., the amount of network congestion, the number of packets transmitted via the network that are lost, etc.). In still other embodiments, the user experience is enhanced by adjusting video encoding parameters based on network conditions, by withholding video data from a queue (or dropping video data already within the queue), and/or by providing a mechanism for resending I-frames that are not received correctly. In some embodiments, more than one of the above techniques (including, in one embodiment, all of the above techniques) are utilized to enhance the user experience.

Figure 1:
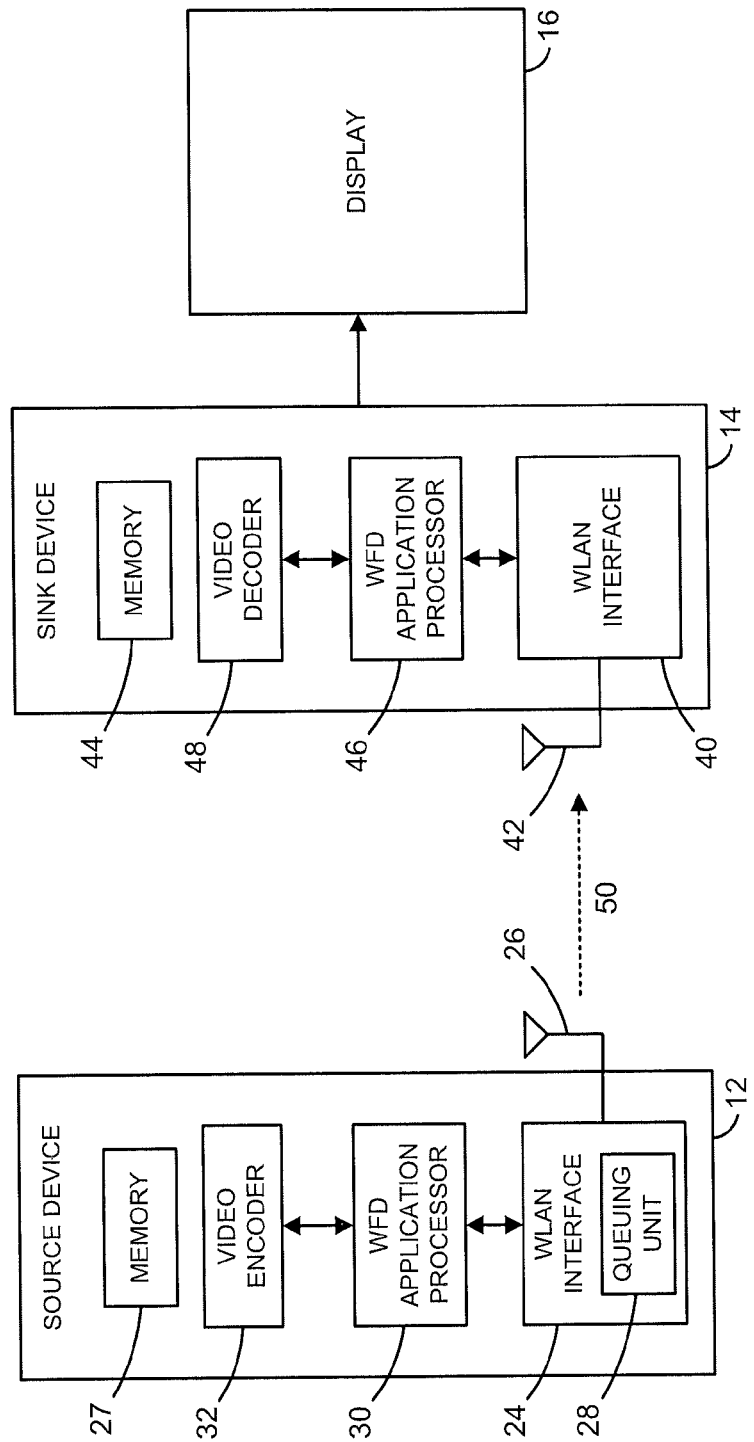
FIG. 1 is a block diagram illustrating an example WiFi Display (WFD) system, according to one embodiment.

FIG. 1 is a block diagram illustrating an example WFD system 10, according to one embodiment. The WFD system 10 includes a source device 12 and a sink device 14. The source device 12 is any WFD-capable (e.g., Miracast) device with access to at least video content (e.g., by downloading video streams via a cellular network connection, or by accessing a video file stored in source device 12, etc.). In various embodiments, for example, the source device 12 is a smartphone, tablet, laptop computer, or other mobile or portable computing device. In some embodiments and/or scenarios, the source device 12 provides multimedia content, including not only video content but also audio content and/or graphical content. For ease of explanation, however, the various embodiments described herein refer only to video content, with the understanding that one or more other types of content, such as audio and/or graphical content, are also provided in some embodiments. The sink device 14 is any WFD-capable (e.g., Miracast) device able to receive video content from the source device 12, and display the video content on a display 16. In various different embodiments and/or scenarios, the display 16 is either a component with a wired connection to sink device 14, or an integral part of the sink device 14. In one embodiment, for example, the sink device 14 is an audio/video (A/V) receiver and the display 16 is a high-definition (HD) television connected to sink device 14 via an HDMI cable. In another example embodiment, the sink device 14 is a laptop computer and the display 16 is a screen integrated with the laptop computer.

In an embodiment, the source device 12 provides video content to sink device 14 via a wireless local area network (WLAN). In one embodiment where the source device 12 and sink device 14 are Miracast devices, for example, the source device 12 provides video content to sink device 14 via a WiFi connection, i.e., the source device 12 communicates with the sink device 14 according to an IEEE 802.11 protocol such as IEEE 802.11a, 802.11b, 802.11n, or 802.11ac, for example. To support these communications, the source device 12 includes a WLAN interface 24 and one or more antennas 26. The WLAN interface 24 includes at least a physical layer (PHY) processing unit and a medium access control (MAC) processing unit (not shown in FIG. 1) that are both configured to operate according to the communication protocol, in an embodiment. The WLAN interface 24 is configured to both transmit and receive data via the WLAN network, in an embodiment. In various embodiments, the WLAN interface 24 is implemented in dedicated firmware or hardware (e.g., on an application-specific integrated circuit (ASIC)), and/or in software (e.g., with the WLAN interface 24 including one or more processors configured to execute software instructions stored in memory 27). The memory 27 includes one or more volatile and/or nonvolatile memories, such as a random access memory (RAM) and/or a read-only memory (ROM), for example.

The WLAN interface also includes a queuing unit 28 that queues WLAN packets prior to transmission to sink device 14. In one embodiment, queuing unit 28 supports a single queue. In other embodiments, queuing unit 28 supports multiple queues (e.g., in parallel).

In addition to WLAN interface 24 and memory 27, the source device 12 includes a WFD application processor 30 and a video encoder 32. The WFD application processor 30 is coupled to the WLAN interface 24. In one embodiment, the WFD application processor 30 generally handles WFD tasks in accordance with the WFD specification, such as tasks related to discovery, pairing, and connection. Although referred to herein as an "application" processor, in some embodiments WFD application processor 30 performs functions not only at the application layer, but also at lower layers (e.g., multiple layers of the WFD/Miracast stack). In some embodiments, the WFD application processor 30 is implemented in software (e.g., with the WFD application processor 30 including one or more processors configured to execute software instructions stored in memory 27) and/or in dedicated firmware or hardware (e.g., on an ASIC). The WFD application processor 30 is external to (i.e., separate from) at least the WLAN interface 24, in an embodiment. Certain operations of the WFD application processor 30 are described in greater detail below.

The video encoder 32 is coupled to the WFD application processor 30, and encodes/compresses video data according to one or more parameters. In one embodiment, for example, the video encoder 32 is associated with a quantization parameter that controls how much spatial information is included in the compressed video data output by video encoder 32, with a larger quantization parameter corresponding to less spatial information and a lower output bit rate. In some embodiments, the video encoder 32 is also, or instead, associated with an average target output data rate parameter.

In an embodiment, the video encoder 32 is an H.264 video encoder using variable length coding (VLC). In other embodiments, however, the video encoder 32 is a different, suitable type of video encoder. In various embodiments, the video encoder 32 is implemented in software (e.g., the video encoder 32 includes one or more processors configured to execute software instructions stored in memory 27) and/or in dedicated firmware or hardware. In some embodiments, the WFD application processor 30 and video encoder 32 are at least in part the same processor or set of processors. In one embodiment, for example, the WFD application processor 30 and video encoder 32 both execute software instructions using the same set of one or more general-purpose processors.

Similar to the source device 12, the sink device 14 includes a WLAN interface 40 and one or more antennas 42. In an embodiment, the WLAN interface 40 is the same as or similar to the WLAN interface 24 of source device 12. In various embodiments, the WLAN interface 40 is implemented in dedicated firmware or hardware (e.g., on an ASIC), and/or in software (e.g., with the WLAN interface 40 including one or more processors configured to execute software instructions stored in memory 44). The memory 44 includes one or more volatile and/or nonvolatile memories, such as RAM and/or ROM, for example.

In addition to WLAN interface 40 and memory 44, the sink device 14 includes a WFD application processor 46 and a video decoder 48. The WFD application processor 46 is coupled to the WLAN interface 40. In one embodiment, the WFD application processor 46 generally handles WFD tasks in accordance with the WFD specification, such as tasks related to discovery, pairing, and connection, and tasks related to rendering of the video content provided by source device 12. As with WFD application processor 30 of source device 12, WFD application processor 46 additionally performs some functions below the application layer (e.g., functions of multiple layers of the WFD/Miracast stack), in some embodiments. In some embodiments, the WFD application processor 46 is implemented in software (e.g., with the WFD application processor 46 including one or more processors configured to execute software instructions stored in memory 44) and/or in dedicated firmware or hardware (e.g., on an ASIC). In an embodiment, the WFD application processor 46 is external to (i.e., separate from) at least the WLAN interface 40. Certain operations of the WFD application processor 46 are described in greater detail below.

The video decoder 48 is coupled to WFD application processor 46, and is able to decode video data that was encoded by video encoder 32 by operating according to the same video compression technique or standard as video encoder 32. In one embodiment where the video encoder 32 is an H.264 video encoder, for example, the video decoder 48 is an H.264 video decoder. In various embodiments, the video decoder 48 is implemented in dedicated firmware or hardware, and/or in software (e.g., with the video decoder 48 including one or more processors configured to execute software instructions stored in memory 44). In some embodiments, the WFD application processor 46 and video decoder 48 are at least in part the same processor or set of processors. In one embodiment, for example, the WFD application processor 46 and video decoder 48 both execute software instructions using the same set of one or more general-purpose processors.

Operation of the WFD system 10 is now described with respect to an embodiment and/or scenario in which the source device 12 provides video content (i.e., video frames of a video stream) to the sink device 14 via a wireless channel 50 of the WLAN network. While FIG. 1 shows that the source device 12 and sink device 14 are communicating directly via the wireless channel 50 (e.g., in a peer-to-peer (P2P) mode, in an embodiment), in other embodiments and/or scenarios the source device 12 and sink device 14 communicate via a WLAN access point not shown in FIG. 1 (e.g., by tunneling via an IEEE 802.11 access point, in an embodiment).

In operation, in an embodiment, the source device 12 discovers and pairs to the sink device 14, and source device 12 and sink device 14 establish a session for streaming video from source device 12 to sink device 14. In an embodiment, source device 12 and/or sink device 14 negotiate or set a video format for the video stream before the source device 12 sends any content to sink device 14. In one embodiment, for example, the WFD application processors 30, 46 exchange Real Time Streaming Protocol (RTSP) messages, via the WLAN network, in order to negotiate a video format for the video stream. In an embodiment, the video format specifies at least a resolution (e.g., 1920×1080, 1280×720, etc.) and/or a refresh rate (e.g., 60 Hz, 30 Hz, etc.). Additionally or alternatively, in some embodiments, the video format specifies other parameters, such as bit depth (e.g., 8-bit depth) and/or chroma format (e.g., 4:2:0 chroma format), for example. In some embodiments where the source device 12 provides multimedia content to the sink device 14, an audio format (e.g., AAC, AC3, LPCM, etc.) is also negotiated or set before the source device 12 sends any content to sink device 14.

In some embodiments, WFD application processor 30 attempts to set a video format for a particular session based on information provided by WLAN interface 24. In one embodiment, for example, WFD application processor 30 receives, from WLAN interface 24, link quality information that indicates a condition of the wireless channel 50 (e.g., a signal-to-noise ratio (SNR), a signal-to-interference-plus-noise ratio (SINR), an estimated capacity of the channel 50, and/or one or more other suitable metrics). Based on the link quality information, WFD application processor 30 selects a video format for the session, in an embodiment. In various embodiments, for example, WFD application processor 30 selects a resolution (e.g., 1920×1080, 1280×720, etc.) and/or a refresh rate (e.g., 60 Hz, 30 Hz, etc.) for a video stream to be sent to sink device 14 during the session. In some embodiments, source device 12 unilaterally sets the selected video format, while in other embodiments source device 12 merely proposes the selected video format, with the final video format being determined based on a negotiation (e.g., RTSP message exchange) with sink device 14.

Once the video format is established, video streaming can begin. The WFD application processor 30 of source device 12 receives the video data for the video stream from a source that is either internal or external to the source device 12. In one embodiment and/or scenario, for example, the WFD application processor 30 receives video data from a media file stored in a non-volatile storage within memory 28. In another example embodiment and/or scenario, the WFD application processor 30 receives video data from a network interface that in turn receives streaming video from a remote source (e.g., from a website, via a WLAN access point or cellular network, etc.).

In an embodiment, the video encoder 32 divides each video frame into one or more "slices," with each slice containing an integral number of macroblocks. In one embodiment and/or scenario, a macroblock is 16×16 pixels. In other embodiments and/or scenarios, macroblocks are other suitable sizes, such as 16×8 pixels or 8×8 pixels. The video encoder 32 compares each macroblock with neighboring macroblocks within the same video frame, and/or with a macroblock in an earlier video frame, to determine a motion vector, in an embodiment. In an embodiment, each video frame slice is an "I-frame" (also referred to as an "I-slice") or a "P-frame" (also referred to as a "P-slice"). An I-frame only uses other macroblocks within the same I-frame as reference macroblocks, while a P-frame also uses macroblocks from the previous frame as reference macroblocks, in an embodiment. In some embodiments, such as embodiments where the video encoder 32 is an H.264 video encoder, a "Group of Pictures" (GOP) is defined, where each GOP begins with an I-frame, and P-frames are inserted at intervals until a new I-frame at the start of a new GOP.

In an embodiment, the video encoder 32 compensates a current macroblock using the motion vector, and then generates information indicative of a difference between the compensated current macroblock and the reference macroblock. The video encoder 32 outputs data representing this difference information at a particular output bit rate, with the output bit rate depending on at least the input bit rate and quantization parameter of the video encoder 32, in an embodiment.

In an embodiment, the WFD application processor 30 packs the compressed video data from video encoder 32 into Network Abstraction Layer Units (NALUs). In some embodiments and/or scenarios, for example, a single frame will be packed into a single NALU. Each NALU is then placed within a Packetized Elementary Stream (PES) that adds timing information for use by the video decoder 48, and the PES is then divided into smaller Transport Stream (TS)

packets, in an embodiment. In one embodiment, each TS packet is 186 bytes long, and can hold up to 182 bytes of payload (video) data.

Figure 2:
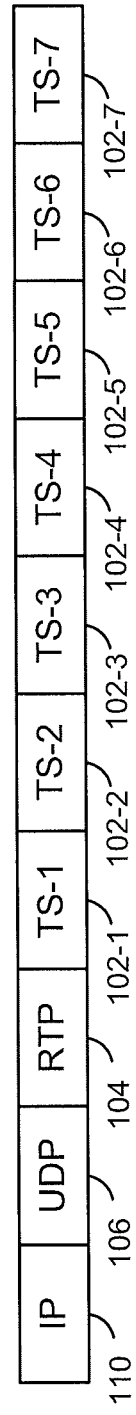
FIG. 2 is a diagram of a conventional WFD packet sent from a source device to a sink device in conventional WFD systems.

Next, in an embodiment, the WFD application processor 30 packages seven TS packets into an enhanced WFD packet. For purposes of comparison, FIG. 2 shows a diagram of a conventional WFD packet 100 sent from a source device to a sink device in a conventional WFD system. As seen in FIG. 2, the conventional WFD packet 100 includes seven TS packets 102-1 through 102-7, a Real Time Protocol (RTP) header portion 104, a User Datagram Protocol (UDP) header portion 106, and an Internet Protocol (IP) header portion 110. Notably, the conventional WFD packet 100 is only 1356 bytes in length, despite the maximum transmission unit (MTU) size for UDP packets being 1500 bytes.

In some embodiments of one aspect of the present invention, however, enhanced WFD packets utilize the additional bytes to include information that is not included in the conventional WFD packet 100. FIG. 3 is a diagram of one such embodiment. In the embodiment of FIG. 3, a WFD packet 120 includes seven TS packets 122-1 through 122-7, an RTP header portion 124, a UDP header portion 126, and an IP header portion 130, which in some embodiments are similar to the like-named portions of the conventional WFD packet 100. In the example WFD packet 120, however, at least some of the extra bytes not utilized in the conventional WFD packet 100 are utilized to convey additional information. In particular, an enhancement (ENH) field 132 serves as a "pseudo second channel" carrying recovery information that can be used by a sink device (e.g., sink device 14) to recover frames after packet loss and/or packet errors. The contents of ENH field 132 are described in more detail below. While FIG. 3 shows ENH field 132 located between the RTP header portion 124 and the TS packet 122-1, in other embodiments ENH field 132 is located at a different suitable location within WFD packet 120, such as the end of the WFD packet 120, for example. Moreover, in some alternative embodiments, the WFD packet 120 includes more, fewer, and/or different fields than are shown in FIG. 3 (e.g., more or fewer TS packets 122, etc.).

Referring again to FIG. 1, in an embodiment, the WFD application processor 30 of source device 12 causes the WFD packet 120 to be sent to the sink device 14 by sending the WFD packet 120 to WLAN interface 24. In one embodiment, for example, the WLAN interface 24 places the WFD packet 120 within a WiFi packet conforming to an IEEE 802.11 (e.g., IEEE 802.11 ac) standard. The WLAN interface 24 passes the WLAN packet to queuing unit 28 to await transmission, and then transmits the WLAN packet to the sink device 14 via WLAN channel 50, in an embodiment.

Figure 4:
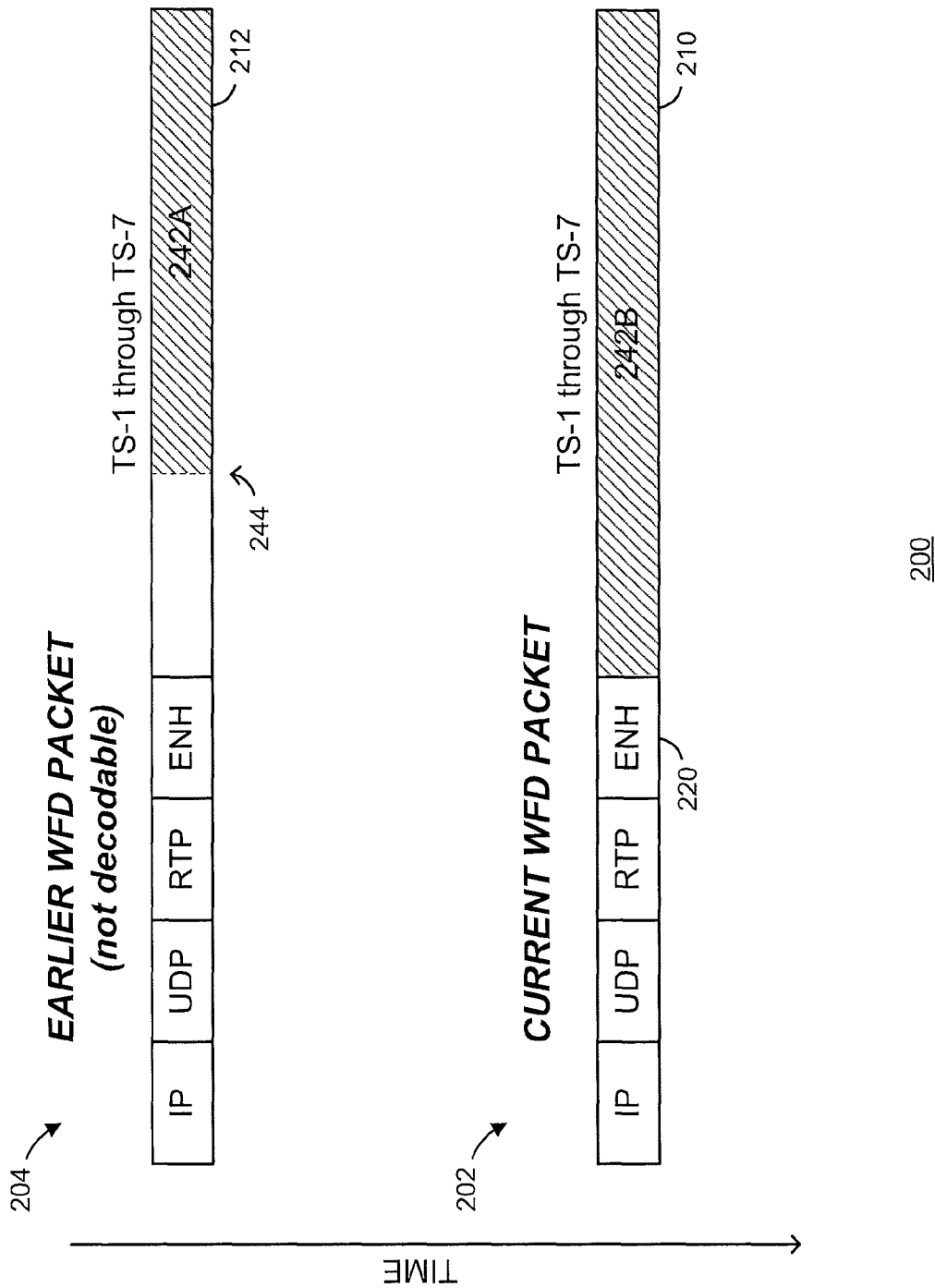
FIG. 4 is a diagram of two example WFD packets sent from the source device to the sink device in the example WFD system of FIG. 1, in a scenario where a macroblock is split across at least the two WFD packets, according to an embodiment.

At the sink device 14, the WLAN interface 40 extracts the WFD packet 120 from the WLAN packet and sends the WFD packet 120 to the WFD application processor 46, in an embodiment. WFD application processor 46 identifies the compressed video data within WFD packet 120, and provides the compressed video data to video decoder 48 for decoding. As discussed above in the Background section, decoding of video frames is very sensitive to data corruption in conventional WFD systems, with errors in the decoded frames (e.g., due to packet loss or packet errors) tending to propagate over time due to the differential nature of the compressed video data. In an embodiment of the WFD system 10 where at least some WFD packets have a structure the same as or similar to WFD packet 120, however, the recovery information (e.g., within ENH field 132) allows the video decoder 48 to function more seamlessly, lessening the impact of packet loss and/or packet errors incurred during transmission over WLAN channel 50. In one embodiment where the TS packets 122 of the WFD packet 120 carry a portion of a macroblock, for example, the ENH field 132 carries information indicating a start position, within an earlier WFD packet, of the macroblock. Such information may be useful to video decoder 48 if the earlier WFD packet was lost or otherwise not decodable by video decoder 48. One such scenario is shown in FIG. 4, according to an embodiment. In FIG. 4, WFD packet 202 represents a packet included within a WLAN packet that was successfully received, without errors, by WLAN interface 40 of sink device 14, while WFD packet 204 represents a packet included within an earlier WLAN packet that was not successfully received at sink device 14. For example, the earlier WLAN packet may be a packet that was lost, or contained non-correctable errors.

In the example embodiment and scenario of FIG. 4, WFD packets 202, 204 both conform to the format of WFD packet 120 in FIG. 3, including TS packets 210 in the current WFD packet 202 and TS packets 212 in the earlier WFD packet 204. Moreover, in this embodiment and scenario, TS packets 212 of the earlier WFD packet 204 contain a beginning portion 242A of a macroblock, while the TS packets 210 of the current WFD packet 202 contain a subsequent portion 242B of the same macroblock. In different scenarios, the macroblock portion 242B immediately follows the beginning macroblock portion 242A, or is separated from the beginning macroblock portion 242A by one or more other portions included in one or more other, intervening WFD packets that are not shown in FIG. 4.

To allow the video decoder 48 to decode the video frame that includes the macroblock with portions 242A, 242B, in an embodiment, the ENH field 220 of the current WFD packet 202 includes information indicating at least the start position 244 of the beginning macroblock portion 242A. Moreover, in some embodiments, the ENH field 220 includes information indicating a location of the macroblock within the video frame. By analyzing the start position and location, the video decoder 48 can take steps to lessen the impact of not having properly received all video data for the macroblock. In one embodiment, for example, the video decoder 48 uses the information in the ENH field 220 to properly keep track of the boundaries between macroblocks, and therefore to decode the remainder of the video frame, which otherwise might not be possible in embodiments where the video encoder 32 uses variable length coding. Additionally, or alternatively, in some embodiments, the video decoder 48 uses the information in the ENH field 220 to "fill in" the incompletely received macroblock (e.g., by using the corresponding macroblock from the previous video frame, in an embodiment).

Referring again to FIG. 3, and in an embodiment where the TS packets 122 of the WFD packet 120 carry at least a portion of a new macroblock, the ENH field 132 additionally, or instead, carries reference vector information that can be used at a sink device to calculate one or more reference vectors. In one embodiment, the reference vector information corresponds to a reference macroblock within an earlier I-frame. In one embodiment and/or scenario, the video decoder 48 uses the reference vector information in the ENH field 132 to properly decode a P-frame that includes the new macroblock. In another embodiment and/or scenario, the video decoder 48 uses the reference vector information in the ENH field 132 to properly decode an I-frame that includes both the (lost) reference macroblock and the new macroblock.

In some embodiments, the WFD system 10 of FIG. 1 also, or alternatively, uses one or more other techniques that improve the user experience in the presence of network conditions that are likely to lead to packet loss or packet errors. In some embodiments, for example, the WFD application processor 30 of source device 12 communicates with WLAN interface 24 to determine a measure of network congestion, and takes one or more actions designed to dynamically adjust the amount/rate of video data based on what the network can bear.

In various embodiments, in order to determine the measure of network congestion, the WFD application processor 30 obtains information indicative of the condition of wireless channel 50, and/or the (actual or theoretical) performance of communications between source device 12 and sink device 14 via wireless channel 50. In some embodiments, WLAN interface 24 indicates the condition of the wireless channel 50 by providing an SNR of wireless channel 50, an SINR of wireless channel 50, an estimated capacity of wireless channel 50, etc. Additionally or alternatively, in some embodiments, WLAN interface 24 indicates the performance of communications via wireless channel 50 by providing a current data rate, bandwidth availability (e.g., whether other devices are using the same bandwidth, as indicated by the WFD throughput parameter information element), a number of WLAN packets lost, a number of WLAN packet errors, etc.

Based on some or all of the information received from WLAN interface 24, the WFD application processor 30 determines the measure of network congestion. In some embodiments, the measure of network congestion is a simple binary value (e.g., a logical output or other data corresponding to "congested" or "not congested," or corresponding to "high congestion" or "low congestion," etc.). In one embodiment, for example, an SINR that is lower than a threshold SINR causes the WFD application processor 30 to determine that the WLAN is congested, while an SINR that is above the threshold SINR causes the WFD application processor 30 to determine that the WLAN is not congested. In another example embodiment, a number of WLAN packet errors that is above a threshold number of WLAN packet errors causes the WFD application processor 30 to determine that the WLAN is congested, while a number of packet WLAN errors that is below a threshold number of WLAN packet errors causes the WFD application processor 30 to determine that the WLAN is not congested. In yet another example embodiment, the WFD application processor 30 determines whether the network is congested based on whether a function of one or more network and/or performance parameters/metrics exceeds (or is less than) a particular threshold (e.g., a function of estimated capacity and throughput, in one embodiment). In some embodiments, the measure of network congestion can be any one of three or more values corresponding to three or more respective network congestion levels (e.g., a value of 0, 1 or 2 corresponding to low, medium or high congestion, in an embodiment).

As noted above, the WFD application processor 30 takes one or more actions depending on the measure of network congestion. In one embodiment, for example, the WFD application processor 30 skips one or more video frames (e.g., does not provide the frame(s) to WLAN interface 24) when determining that the WLAN network is congested, such that the frame(s) is/are not sent to sink device 14. In another example embodiment, the WFD application processor 30 adjusts a parameter of video encoder 32 (e.g., sends the video encoder 32 a command to reduce the quantization parameter, and/or a target output data rate, in an embodiment) when determining that the WLAN network is congested, such that the video encoder 32 outputs compressed video data at a lower bit rate.

In another embodiment, the measure of network congestion is, or includes, a length of time that the network has been congested (or is at a particular level of congestion, etc.), and the WFD application processor 30 takes different actions depending on how long the network congestion persists. In some embodiments, the WFD application processor 30 changes, or attempts to change, a video format of the video stream (e.g., by exchanging RTSP M4 messages with sink device 14) when determining that the WLAN network has been congested for more than a threshold length of time. In one embodiment, for example, the WFD application processor 30 reduces the refresh rate for the video stream (e.g., from 60 Hz to 30 Hz, etc.) when determining that the WLAN network has been congested for more than a threshold length of time. In another example embodiment, the WFD application processor 30 instead, or additionally, reduces the resolution for the video stream (e.g., from 1920×1080 to 1280×720, etc.) when determining that the WLAN network has been congested for more than a threshold length of time.

Additionally or alternatively, in some embodiments, the WFD application processor 30 dynamically controls the loading of queuing unit 28 based on information received from WLAN interface 24. In some embodiments, for example, the queuing unit 28 provides the WFD application processor 30 with information indicating the length/depth of one or more queues in queuing unit 28 (e.g., a number of WLAN packets in each queue, in an embodiment). In one such embodiment, the WFD application processor 30 stops sending new video data (e.g., new WFD packets) to WLAN interface 24 (and, therefore, to queuing unit 28) when some or all of the queues are too deep. In another embodiment, the WFD application processor 30 sends a "fill in" frame (e.g., information that informs video decoder 48 that the current frame is identical to the previous frame), which may freeze the video momentarily but degrade overall video quality only marginally.

In another embodiment and/or scenario, the WFD application processor 30 sends the WLAN interface 24 a command to drop some data in one or more queues of queuing unit 28 when some or all of the queues are too deep. In an embodiment, the WFD application processor 30 decides to pause the sending of video data to WLAN interface 24, and/or to instruct queuing unit 28 to drop video data (e.g., WLAN packets), when a "queue length" is above a threshold length. In various different embodiments where the queuing unit 28 includes multiple queues that may be of different lengths at any given time, the queue length that is compared to the threshold is a longest queue length, a shortest queue length, an average queue length, or some other suitable metric.

In some embodiments, the WFD application processor 30 of source device 12 monitors the processing power being utilized by source device 12. In one embodiment, for example, the WFD application processor 30 monitors the processing power being utilized by other (e.g., non-Miracast) applications running on source device 12, and takes one or more of the above steps (e.g., skipping video frames, lowering the output data rate of video encoder 32, etc.) based on the monitored processing power and a heuristic model.

In some embodiments, the WFD application processor 30 of source device 12 provides an explicit mechanism for resending I-frames that are lost. In one embodiment, for example, the WFD application processor 30 causes source device 12 to resend an I-frame to sink device 14 if source device 12 does not receive an acknowledgment (e.g., a Layer 2 acknowledgment) from sink device 14 in response to sending one or more packets (carrying data of the I-frame) to sink device 14.

Additionally or alternatively, in some embodiments, the sink device 14 provides a Layer 3 mechanism for video recovery when an I-frame is lost. In one embodiment, for example, the WFD application processor 46 of sink device 14 monitors the RTP sequence number of WFD packets received from source device 12 via wireless channel 50, and requests that the I-frame data be resent by source device 12 (or, in an alternative embodiment, requests the instantaneous decoding refresh (IDR) picture from source device 12) when detecting that an I-frame has been lost.

In some embodiments, the WFD system 10 of FIG. 1 implements more than one of the features described above for enhancing user experience. In one embodiment, for example, the source device 12 (A) includes recovery information in WFD packets (e.g., as shown in FIG. 3), (B) skips video frames and/or reconfigures the video encoder 32 if the WLAN network is congested for a short time period, (C) adjusts one or more video format parameters if the WLAN network is congested for a long time period (e.g., beyond a threshold amount of time), and (D) withholds video data from WLAN interface 24 (and/or commands WLAN interface 24 to drop video data in queuing unit 28) when the queue is too deep. Moreover, in some embodiments, and source device 12 and/or sink device 14 implement the mechanisms, described above, for providing a new I-frame when an I-frame has been lost.

FIGS. 5-10 are flow diagrams of example methods corresponding to some of the various techniques for enhancing user experience described above, according to various embodiments.

Figure 5:
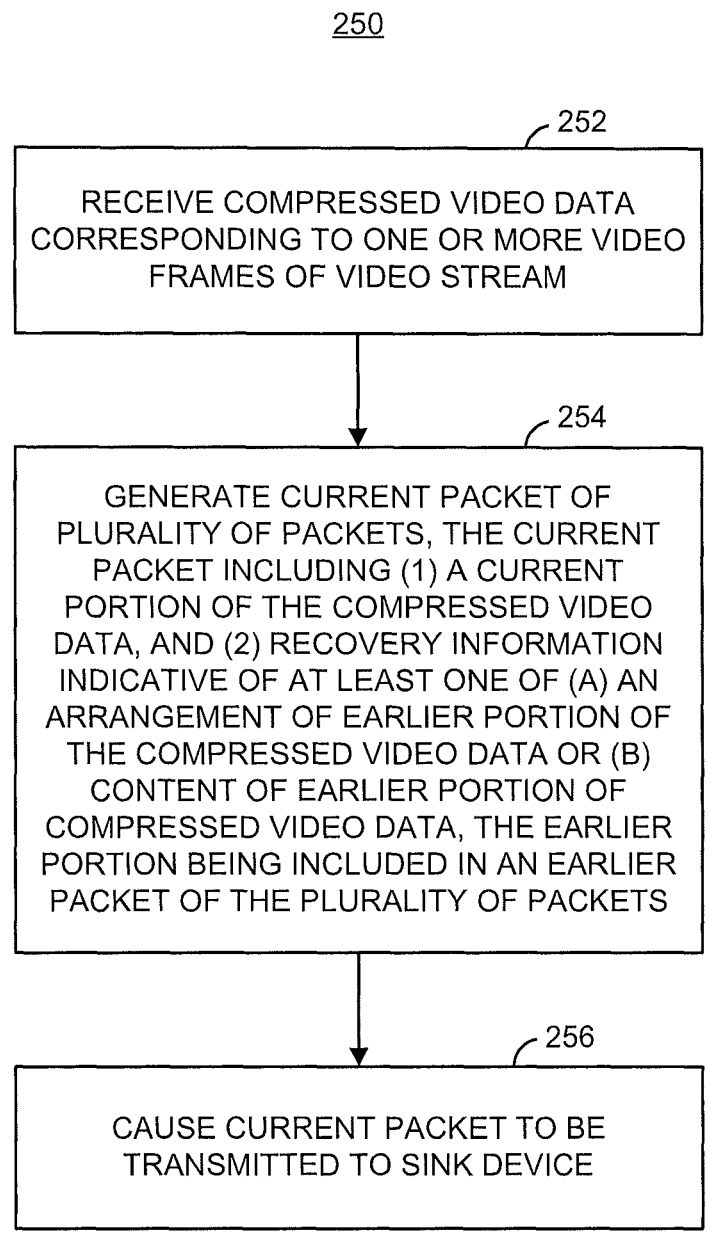
FIG. 5 is a flow diagram of an example method, implementable by a source device, of providing a sink device with information for decoding video frames when a WFD packet has not been received correctly, according to an embodiment.

FIG. 5 is a flow diagram of an example method 250, implementable by a source device (e.g., source device 12 of FIG. 1), of providing a sink device (e.g., sink device 14 of FIG. 1) with information for decoding video frames when an earlier packet has not been received correctly, according to an embodiment. In an embodiment, the method 250 is implemented in whole or in part by a set of one or more processors, such as WFD application processor 30 of FIG. 1, for example.

At block 252, compressed video data corresponding to one or more video frames (e.g., I-frames and/or P-frames) of a video stream is received. In one embodiment, the compressed video data is received from a video encoder, such as video encoder 32 of FIG. 1. In various embodiments and/or scenarios, the video stream includes video initially stored as a file at the source device (e.g., in memory 27 of FIG. 1), or video initially downloaded (e.g., as a live video feed) from the Internet by the source device. In some embodiments, the compressed video data includes a plurality of macroblocks corresponding to the video frame(s) represented by the compressed video data.

At block 254, a current packet of a plurality of packets is generated, where the plurality of packets collectively includes the compressed video data received at block 252. The current packet includes a current portion of the compressed video data, as well as recovery information. The recovery information is indicative of an arrangement of an earlier portion of the compressed video data, and/or content of the earlier portion of the compressed video data, where the "earlier portion" of the compressed video data refers to a portion of the compressed video data that is included in an earlier packet of the plurality of packets.

In one embodiment and scenario where the earlier portion of the compressed video data (in the earlier packet) includes a beginning portion of a new macroblock, and the current portion of the compressed video data (in the current packet) includes a subsequent portion of the new macroblock, the recovery information includes a start position, within the earlier packet, of the new macroblock, and/or a location of the new macroblock within at least one of the one or more video frames represented by the compressed video data.

In one embodiment, the recovery information in the current packet includes reference vector information corresponding to a reference macroblock from one of the one or more video frames. In one embodiment and scenario, for example, the current portion of the compressed video data (in the current packet) includes at least a portion of a new macroblock associated with a P-frame of a GOP, and the reference vector information corresponds to a reference macroblock associated with an (earlier) I-frame of the same GOP. In an alternative embodiment and/or scenario, the reference vector information corresponds to a reference macroblock that is included within the same I-frame as the new macroblock. In each of these embodiments/scenarios where the recovery information includes reference vector information that allows the sink device to calculate one or more reference vectors, the earlier packet is a packet that had carried at least a portion of the reference vector information.

In some embodiments, the current packet is generated to include at least a UDP header portion, and each packet of the plurality of packets includes at least a UDP header portion. In one embodiment, for example, the current packet, and each packet of the plurality of the plurality of packets, is the same as or similar to WFD packet 120 of FIG. 3. In some embodiments, the recovery information is included in a field of a header of the current packet (e.g., similar to ENH field 132 in FIG. 3), which may be considered a "pseudo second channel."

At block 256, the current packet is caused to be transmitted to the sink device. In one embodiment, causing the current packet to be transmitted to the sink device includes providing the current packet to a WLAN interface of the source device, such as WLAN interface 24 of FIG. 1. In some embodiments, causing the current packet to be transmitted to the sink device also includes sending a command to the WLAN interface.

In some embodiments, the blocks of method 250 are not entirely distinct in time. In one embodiment, for example, the current packet is generated at block 254, and/or caused to be transmitted at block 256, while other portions of the compressed video data are still being received at block 252.

Figure 6:
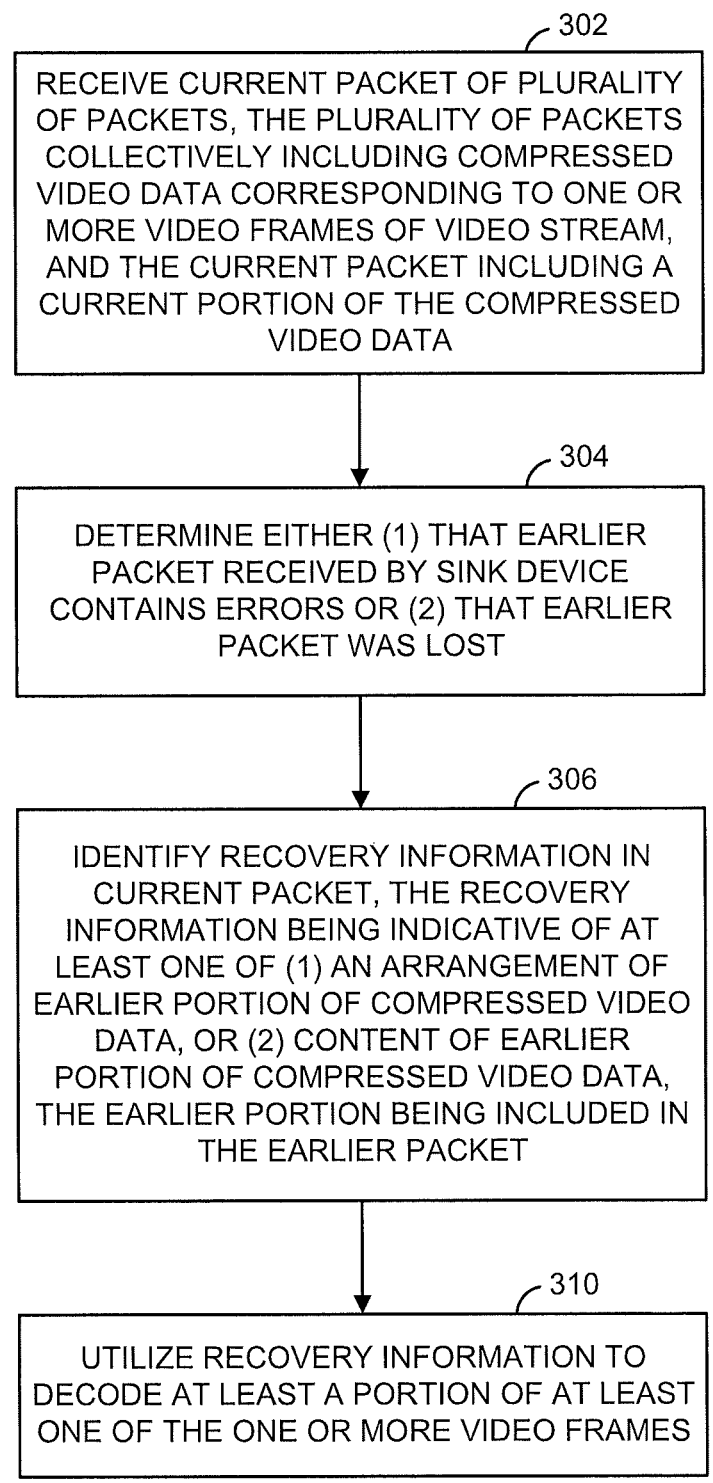
FIG. 6 is a flow diagram of an example method, implementable by a sink device, for decoding video frames received from a source device when a WFD packet has not been received correctly, according to an embodiment.

FIG. 6 is a flow diagram of an example method 300, implementable by a sink device (e.g., sink device 14 of FIG. 1), for decoding video frames of a video stream received from a source device (e.g., source device 12 of FIG. 1) when an earlier packet has not been received correctly, according to an embodiment. In one embodiment, the method 300 is implemented on the sink device side when the method 250 of FIG. 5 is implemented on the source device side. In some embodiments, the method 300 is implemented in whole or in part by a set of one or more processors, such as WFD application processor 46 of FIG. 1, for example. In one embodiment, the method 300 is implemented in part by WFD application processor 46 of FIG. 1, and in part by video decoder 48 of FIG. 1.

At block 302, a current packet of a plurality of packets is received. In an embodiment, the current packet is received from a WLAN interface of the sink device (e.g., WLAN interface 40 of FIG. 1). The plurality of packets collectively includes compressed video data, with the compressed video data corresponding to one or more video frames (e.g., I-frames and/or P-frames) of a video stream from the source device. The current packet includes a current portion of the compressed video data. In some embodiments, the compressed video data includes a plurality of macroblocks corresponding to the video frame(s) represented by the compressed video data.

At block 304, it is determined either that an earlier packet (of the plurality of packets) that was received by the sink device contains errors, or that the earlier packet was lost.

At block 306, recovery information is identified in the current packet received at block 302. The recovery information is indicative of an arrangement of an earlier portion of the compressed video data, and/or content of the earlier portion of the compressed video data, where the "earlier portion" of the compressed video data is a portion of the compressed video data that was included in the earlier packet that was determined to be lost (or to contain errors) at block 304. In various embodiments, the recovery information identified at block 306 is the same as or similar to any of the types of recovery information discussed above in connection with block 252 of the method 250 (e.g., including a start position of the new macroblock, a location of the new macroblock within a video frame, and/or reference vector information corresponding to a reference macroblock). In some embodiments, the recovery information is included in a field of a header of the current packet (e.g., similar to ENH field 132 in FIG. 3), which may be considered a "pseudo second channel."

At block 310, the recovery information identified at block 306 is utilized to decode at least a portion of at least one of the one or more video frames represented by the compressed video data. In one embodiment, block 310 includes the actual decoding of the video frames or video frame portions, and is at least in part implemented by a video decoder, such as video decoder 48 of FIG. 1. In an alternative embodiment, block 310 is implemented entirely by a WFD application processor, such as WFD application processor 46 of FIG. 1, and includes formatting and/or processing the recovery information and/or presenting the recovery information to the video decoder to facilitate the decoding process. In one of these latter embodiments, for example, block 310 includes using recovery information that specifies a start position of a macroblock in an earlier packet, and a location of the macroblock in a video frame, to provide a substitute or "fill in" macroblock (e.g., a macroblock from an earlier video frame) to the video decoder in place of the partially received new macroblock. In another of these latter embodiments, block 310 includes providing reference vector information in the recovery information to the video decoder so that the video decoder can decode the new macroblock and/or current video frame despite having failed to properly decode the reference macroblock.

In some embodiments, some blocks of the method 300 are not entirely distinct in time, and/or do not occur in the order shown in FIG. 6. In one embodiment, for example, block 304 occurs before, or at least in part simultaneously with, block 302.

Figure 7:
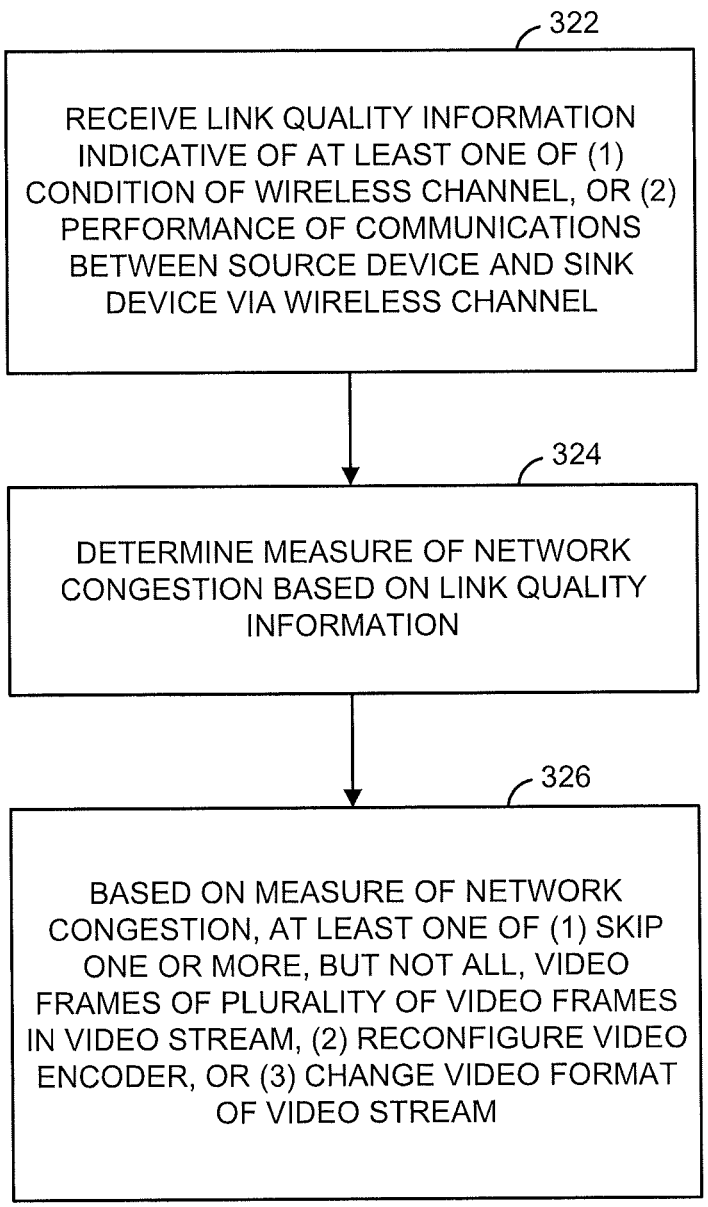
FIG. 7 is a flow diagram of an example method, implementable by a source device providing a video stream to a sink device, for enhancing user experience based on network conditions, according to an embodiment.

FIG. 7 is a flow diagram of an example method 320, implementable by a source device (e.g., source device 12 of FIG. 1) operable to provide a video stream to a sink device (e.g., sink device 14 of FIG. 1) via a wireless channel, of enhancing user experience based on network conditions, according to an embodiment. In an embodiment, the method 320 is implemented in whole or in part by a set of one or more processors, such as WFD application processor 30 of FIG. 1, for example.

At block 322, link quality information is received. In an embodiment, the link quality information is received from a network interface, such as WLAN interface 24 of FIG. 1, for example. The link quality information is indicative of a condition of the wireless channel, and/or indicative of performance of communications between the source device and sink device via the wireless channel. In various embodiments, for example, the link quality information is indicative of channel SNR, channel SINR, estimated channel capacity, actual or theoretical current throughput, number of WLAN packets dropped (e.g., a raw number, a packet error rate, etc.), information specifying reasons why one or more packets were dropped, etc.

At block 324, a measure of network congestion is determined based on the link quality information received at block 322. In some embodiments, the determination at block 324 is a simple binary determination (e.g., the measure of network congestion is a value corresponding to "congested" or "not congested," a value corresponding to "high congestion" or "low congestion," etc.). In one embodiment, for example, an SINR of the wireless channel, received at block 322, is compared to a threshold SINR, and the network is considered to be "congested" if the SINR is below the threshold SINR. In other embodiments, it is instead determined at block 324 which of three or more network congestion levels currently exists. In one embodiment, for example, an SINR of the wireless channel, received at block 322, is compared to a set of SINR ranges, and the network is considered to have "low congestion," "medium congestion," or "high congestion" depending on the SINR value. In other embodiments, more complex algorithms utilize multiple parameters in the link quality information received at block 322. In an embodiment, the determination at block 324 includes determining whether the network has been congested (or has had a particular level or severity of congestion) for at least a threshold period of time.

At block 326, based on the measure of network congestion determined at block 324, one or more operations are performed. In one embodiment, for example, one or more, but not all, video frames of a plurality of video frames in the video stream are skipped at block 326 based on the measure of network congestion, such that the frame(s) is/are not provided to the sink device. In one such embodiment, video frames are skipped simply by not sending those video frames to a network interface, such as WLAN interface 24 of FIG. 1, for example. Additionally or alternatively, in an embodiment, a video encoder operating on the plurality of video frames (e.g., video encoder 32 of FIG. 1) is reconfigured at block 326 based on the measure of network congestion, such that an output bit rate of the video encoder is changed. In one such embodiment, the video encoder is reconfigured by sending the video encoder a command to change the quantization parameter, and/or another suitable parameter that controls the output data rate of the video encoder (e.g., a target output data rate, or average target output data rate, parameter, in various embodiments). Additionally or alternatively, in an embodiment, a video format of the video stream is changed at block 326 based on the measure of network congestion. In one such embodiment, a refresh rate of the video stream and/or a resolution of the video stream is/are changed based on the measure of network congestion. In some embodiments, the refresh rate and/or resolution is/are changed by initiating an exchange of RTSP messages with the sink device (e.g., as a part of a renegotiation of the video format, in an embodiment).

Generally, in various embodiments, the above operations are designed to reduce the amount/rate of data that the source device sends to the sink device over the wireless channel when the network is congested. Thus, for example, one or more video frames are skipped at block 326, in an embodiment, when it is determined at block 324 that the network is congested. In another example embodiment, a quantization parameter of the video encoder is increased at block 326 (thereby decreasing the output bit rate of the video encoder) when it is determined at block 324 that the network is congested. In yet another example embodiment, the refresh rate, and/or the resolution, of the video stream is reduced at block 326 when it is determined at block 324 that the network has been congested for at least a threshold period of time. By reducing the amount/rate of video data sent over the wireless channel, the source device increases the probability that video data is received and properly decoded at the sink device, thereby decreasing the likelihood of missing video frames or creating visible artifacts.

In an embodiment, the method 320 is repeated at different times during transmission of the video stream (e.g., periodically, or in another suitable manner), providing automatic and dynamic control of the various video-related parameters or operations. Moreover, in some embodiments, changes can be made to increase or to decrease the amount/rate of video data that is supplied over the wireless channel. In one embodiment and scenario, for example, frames are skipped, the quantization parameter is increased, and/or the refresh rate and/or resolution are decreased in a first iteration of block 326 (e.g., after it is determined in a first iteration of block 324 that the network is congested, or more congested, etc.), and frames are no longer skipped, the quantization parameter is decreased, and/or the refresh rate and/or resolution are increased in a second iteration of block 326 (e.g., after it is determined in a second iteration of block 324 that the network is no longer congested, or less congested, etc.).

Figure 8:
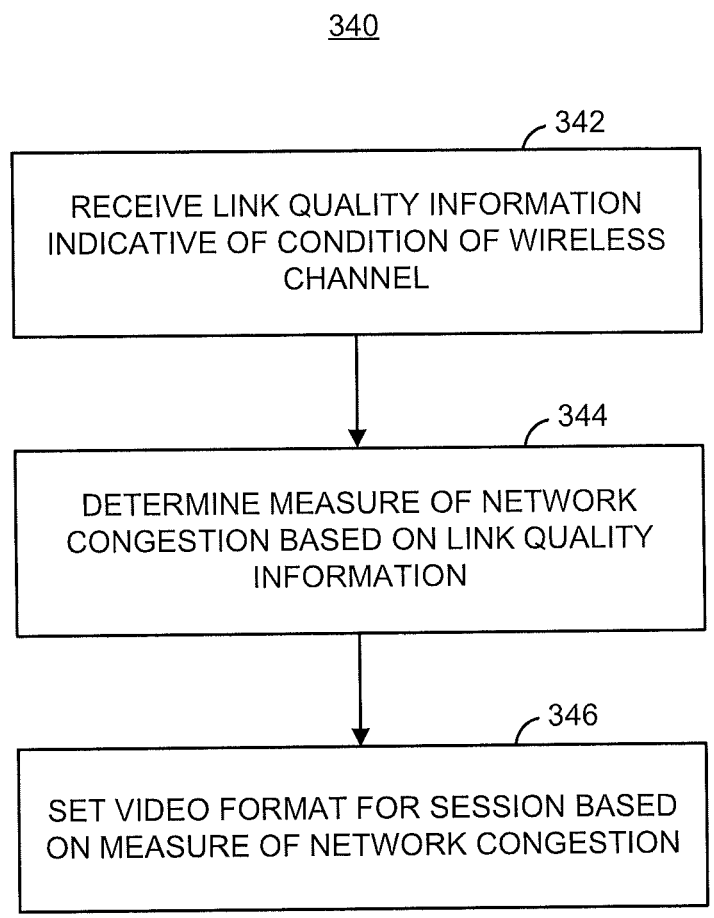
FIG. 8 is a flow diagram of an example method, implementable by a source device, of setting a video format when establishing a new session, according to an embodiment.

In other embodiments, network congestion is instead, or additionally, taken into account during session establishment, before the source device provides any content to the sink device. FIG. 8 is a flow diagram of an example method 340, implementable by a source device (e.g., source device 12 of FIG. 1), of setting a video format when establishing a new session with a sink device (e.g., sink device 14 of FIG. 1), according to an embodiment. In an embodiment, the method 340 is implemented in whole or in part by a set of one or more processors, such as WFD application processor 30 of FIG. 1, for example.

At block 342, link quality information is received. In an embodiment, the link quality information is received from a network interface, such as WLAN interface 24 of FIG. 1, for example. The link quality information is indicative of a condition of the wireless channel. In various embodiments, for example, the link quality information is indicative of channel SNR, channel SINR, estimated channel capacity, etc.

At block 344, a measure of network congestion is determined based on the link quality information received at block 342. In various different embodiments, the determination at block 344 is a simple binary determination, or is instead a determination of which of three or more values (corresponding to different levels of network congestion) currently exists. In some embodiments, the determination at block 344 includes determining an amount of time that the network has been congested, or an amount of time that a particular level of network congestion has persisted, etc.

At block 346, a video format is set for the session based on the measure of network congestion determined at block 344. In one embodiment, for example, a refresh rate of the video stream is set at block 346 based on the measure of network congestion. Additionally or alternatively, in an embodiment, a resolution of the video stream is set at block 346 based on the measure of network congestion. In some embodiments, the refresh rate and/or resolution is/are set by initiating an exchange of RTSP messages with the sink device (e.g., as a part of a negotiation of the video format, in an embodiment).

Figure 9:
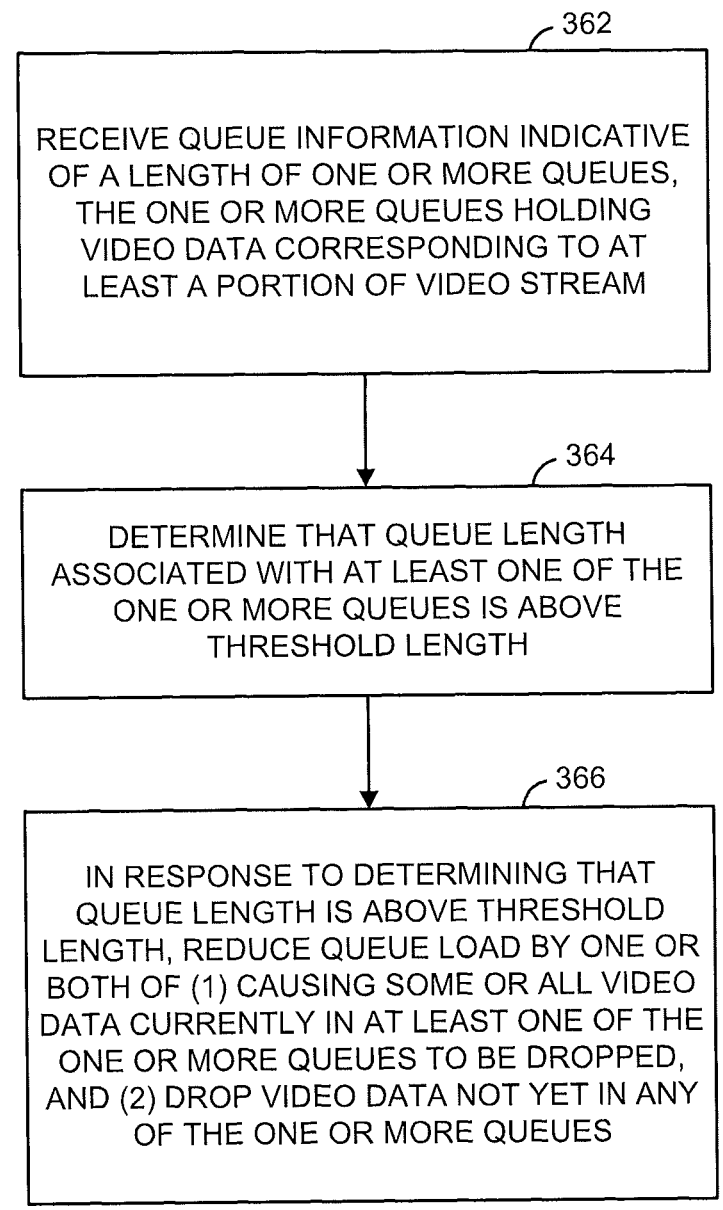
FIG. 9 is a flow diagram of an example method, implementable by a source device, of reducing a queue load based on a length of one or more queues holding video data, according to an embodiment.

FIG. 9 is a flow diagram of an example method 360, implementable by a source device (e.g., source device 12 of FIG. 1), of reducing a queue load based on a length of one or more queues holding video data of a video stream that is to be sent to a sink device (e.g., sink device 14 of FIG. 1), according to an embodiment. In an embodiment, the method 360 is implemented in whole or in part by a set of one or more processors, such as WFD application processor 30 of FIG. 1, for example.

At block 362, queue information is received. In an embodiment, the queue information is received from a network interface, such as WLAN interface 24 of FIG. 1, for example. The queue information is indicative of a length of one or more queues holding video data corresponding to at least a portion of the video stream. In an embodiment, the one or more queues are a part of a queuing unit in a network interface, such as queuing unit 28 in WLAN interface 24 of FIG. 1, for example. In one such embodiment, the queue(s) is/are designed to hold packets (e.g., WiFi packets) that contain the video data.

At block 364, it is determined that a queue length associated with at least one of the one or more queues is above a threshold length. In an embodiment, the "queue length" that is compared to the threshold is any suitable metric representing the length of one or more of the queues. In one embodiment, for example, the queue length is equal to the depth/length of the queue holding the most data (or highest number of packets, etc.). In another example embodiment, the queue length is equal to the depth/length of the queue holding the least data (or lowest number of packets, etc.). In yet another example embodiment, the queue length is equal to an average depth/length of two or more queues.

At block 366, in response to determining (at block 364) that the queue length is above the threshold length, the queue load is reduced. In some embodiments, the queue load is reduced by causing some or all video data currently in at least one of the queues (e.g., queued WiFi packets that contain the video data, in an embodiment) to be dropped. In one embodiment, for example, the queue load is reduced by sending a command to drop the data/packets to a network interface that includes the queues (e.g., sending a command to WLAN interface 24 of FIG. 1). Additionally or alternatively, in some embodiments, the queue length is reduced by dropping video data not yet in any of the one or more queues, such that the video data (e.g., the corresponding WFD packets) is not received by the network interface (e.g., WLAN interface 24 of FIG. 1). In one such embodiment, video data is dropped (e.g., all WFD packets are discarded rather than provided to the network interface) until a new GOP begins.

Figure 10:
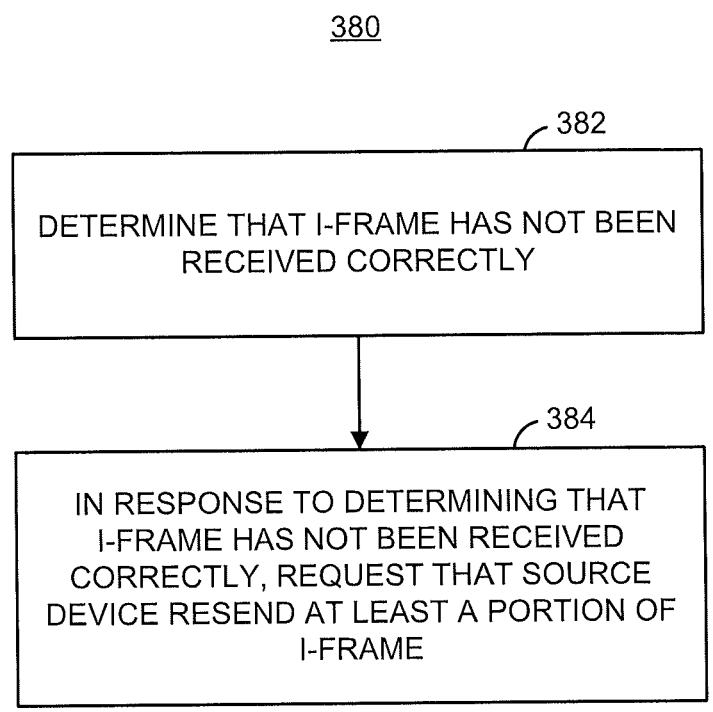
FIG. 10 is a flow diagram of an example method, implementable by a sink device, of triggering video recovery when an I-frame is not received correctly, according to an embodiment.

As noted above, WFD systems are particularly vulnerable to data corruption occurring in I-frames. FIG. 10 is a flow diagram of an example method 380, implementable by a sink device (e.g., sink device 14 of FIG. 1), of triggering video recovery when an I-frame is not received correctly from a source device (e.g., source device 12 of FIG. 1), according to an embodiment. In an embodiment, the method 380 is implemented in whole or in part by a set of one or more processors, such as WFD application processor 46 of FIG. 1, for example.

At block 382, it is determined that an I-frame has not been received correctly. In one embodiment, the determination at block 382 is made by monitoring an RTP sequence number and detecting a missing one of a sequence that corresponds to an I-frame.

At block 384, in response to determining (at block 382) that the I-frame has not been received correctly, the source device is requested to resend at least a portion of the I-frame (i.e., compressed video data corresponding to at least a portion of the I-frame). In one embodiment, for example, the sink device sends the source device a message requesting the IDR picture.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an ASIC, etc.

Aspects of the present invention further relate to one or more of the following clauses.

In one embodiment, a method is implementable in a source device, wherein the source device is operable to provide, via a wireless channel, a video stream to a sink device for display by the sink device. The method includes receiving, in the source device, compressed video data corresponding to one or more video frames of the video stream, and generating, in the source device, a current packet of a plurality of packets. The plurality of packets collectively includes the compressed video data. The current packet includes a current portion of the compressed video data and recovery information indicative of at least one of (i) an arrangement of an earlier portion of the compressed video data, or (ii) content of the earlier portion of the compressed video data, wherein the earlier portion of the compressed video data is data included in an earlier packet of the plurality of packets. The method also includes causing, in the source device, the current packet to be transmitted to the sink device.

In some embodiments, the method includes one or more of the following features.

The compressed video data includes a plurality of macroblocks corresponding to the one or more video frames, the earlier portion of the compressed video data includes a beginning portion of a new macroblock of the plurality of macroblocks, and the current portion of the compressed video data includes a subsequent portion of the new macroblock.

The recovery information includes a start position, within the earlier packet, of the new macroblock.

The recovery information further includes a location, within at least one of the one or more video frames, of the new macroblock.

The compressed video data includes a plurality of macroblocks corresponding to the one or more video frames, the current portion of the compressed video data includes at least a portion of a new macroblock of the plurality of macroblocks, and the recovery information includes reference vector information corresponding to a reference macroblock of the plurality of macroblocks.

The new macroblock is associated with a P-frame of a Group of Pictures (GOP), wherein the P-frame is a video frame, of the one or more video frames, that utilizes temporal compression, and the reference macroblock is associated with an I-frame of the GOP, wherein the I-frame is a video frame, of the one or more video frames, that utilizes spatial compression.

The new macroblock is associated with an I-frame, wherein the I-frame is a video frame, of the one or more video frames, that utilizes spatial compression, and the reference macroblock is also associated with the I-frame.

Generating the current packet includes generating a current packet having at least a User Datagram Protocol (UDP) header portion, and each of the plurality of packets has at least a respective UDP header portion.

Causing the current packet to be transmitted to the sink device includes providing the current packet to a wireless local area network (WLAN) interface of the source device.

In another embodiment, a system in a source device, wherein the source device is operable to provide, via a wireless channel, a video stream to a sink device for display by the sink device, includes one or more processors configured to receive, from a video encoder in the source device, compressed video data corresponding to one or more video frames of the video stream, and generate a current packet of a plurality of packets. The plurality of packets collectively includes the compressed video data. The current packet includes a current portion of the compressed video data, and recovery information indicative of at least one of (i) an arrangement of an earlier portion of the compressed video data, or (ii) content of the earlier portion of the compressed video data. The earlier portion of the compressed video data is data included in an earlier packet of the plurality of packets. The one or more processors are also configured to cause the current packet to be transmitted to the sink device.

In some embodiments, the system includes one or more of the following features.

The compressed video data includes a plurality of macroblocks corresponding to the one or more video frames, the earlier portion of the compressed video data includes a beginning portion of a new macroblock of the plurality of macroblocks, and the current portion of the compressed video data includes a subsequent portion of the new macroblock.

The recovery information includes at least one of (i) a start position, within the earlier packet, of the new macroblock, or (ii) a location, within at least one of the one or more video frames, of the new macroblock.

The compressed video data includes a plurality of macroblocks corresponding to the one or more video frames, the current portion of the compressed video data includes at least a portion of a new macroblock of the plurality of macroblocks, and the recovery information includes reference vector information corresponding to a reference macroblock of the plurality of macroblocks.

The one or more processors are configured to generate the current packet at least by generating a current packet having at least a User Datagram Protocol (UDP) header portion, and each of the plurality of packets has at least a respective UDP header portion.

The one or more processors are configured to cause the current packet to be transmitted to the sink device at least by providing the current packet to a wireless local area network (WLAN) interface of the source device.

In another embodiment, a method is implementable in a sink device, wherein the sink device is operable to receive, via a wireless channel, a video stream from a source device for display by the sink device. The method includes receiving, in the sink device, a current packet of a plurality of packets. The plurality of packets collectively includes compressed video data, the compressed video data corresponds to one or more video frames of the video stream, and the current packet includes a current portion of the compressed video data. The method also includes determining, in the sink device, either (i) that an earlier packet, of the plurality of packets, received by the sink device contains errors or (ii) that the earlier packet was lost, and identifying, in the sink device, recovery information in the current packet. The recovery information is indicative of at least one of (i) an arrangement of an earlier portion of the compressed video data, or (ii) content of the earlier portion of the compressed video data. The earlier portion of the compressed video data is data included in the earlier packet. The method also includes utilizing the recovery information to decode at least a portion of at least one of the one or more video frames.

In some embodiments, the method includes one or more of the following features.

The compressed video data includes a plurality of macroblocks corresponding to the one or more video frames, the earlier portion of the compressed video data includes a beginning portion of a new macroblock of the plurality of macroblocks, and the current portion of the compressed video data includes a subsequent portion of the new macroblock.

Identifying recovery information in the current packet includes one or both of (i) identifying a start position, within the earlier packet, of the new macroblock, and (ii) identifying a location, within at least one of the one or more video frames, of the new macroblock.

Utilizing the recovery information to decode the at least a portion of at least one of the one or more video frames includes utilizing a macroblock of an earlier video frame instead of the new macroblock.

The compressed video data includes a plurality of macroblocks corresponding to the one or more video frames, the current portion of the compressed video data includes at least a portion of a new macroblock of the plurality of macroblocks, identifying recovery information in the current packet further includes identifying reference vector information corresponding to a reference macroblock of the plurality of macroblocks, and utilizing the recovery information to decode the at least a portion of at least one of the one or more video frames includes utilizing the reference vector information to decode the at least a portion of at least one of the one or more video frames.

Receiving the current packet includes receiving the current packet from a wireless local area network (WLAN) interface of the sink device.

In another embodiment, a system in a sink device, wherein the sink device is operable to receive, from a source device and via a wireless channel, a video stream for display by the sink device, includes one or more processors configured to receive a current packet of a plurality of packets. The plurality of packets collectively includes compressed video data, the compressed video data corresponds to one or more video frames of the video stream, and the current packet includes a current portion of the compressed video data. The one or more processors are also configured to determine either (i) that an earlier packet, of the plurality of packets, received by the sink device contains errors or (ii) that the earlier packet was lost, and identify recovery information in the current packet. The recovery information is indicative of at least one of (i) an arrangement of an earlier portion of the compressed video data, or (ii) content of the earlier portion of the compressed video data. The earlier portion of the compressed video data is data included in the earlier packet. The one or more processors are also configured to utilize the recovery information to decode the current packet.

In some embodiments, the system includes one or more of the following features.

The compressed video data includes a plurality of macroblocks corresponding to the one or more video frames, the earlier portion of the compressed video data includes a beginning portion of a new macroblock of the plurality of macroblocks, and the current portion of the compressed video data includes a subsequent portion of the new macroblock.

The one or more processors are configured to identify the recovery information in the current packet at least by one or both of (i) identifying a start position, within the earlier packet, of the new macroblock, and (ii) identifying a location, within at least one of the one or more video frames, of the new macroblock.

The one or more processors are configured to utilize the recovery information to decode the at least a portion of at least one of the one or more video frames at least by utilizing a macroblock of an earlier video frame instead of the new macroblock.

The compressed video data includes a plurality of macroblocks corresponding to the one or more video frames, the current portion of the compressed video data includes at least a portion of a new macroblock of the plurality of macroblocks, the one or more processors are configured to identify the recovery information in the current packet at least by identifying reference vector information corresponding to a reference macroblock of the plurality of macroblocks, and the one or more processors are configured to utilize the recovery information to decode the at least a portion of at least one of the one or more video frames at least by utilizing the reference vector information to decode the at least a portion of the at least one of the one or more video frames.

In another embodiment, a method is implementable in a source device, wherein the source device is operable to provide, via a wireless channel, a video stream to a sink device for display by the sink device. The method includes receiving, in the source device, link quality information indicative of at least one of (i) a condition of the wireless channel, or (ii) performance of communications between the source device and the sink device via the wireless channel. The method also includes determining, in the source device, a measure of network congestion based on the link quality information, and based on the measure of network congestion, at least one of (i) skipping, in the source device, one or more, but not all, video frames of a plurality of video frames in the video stream, such that the one or more video frames are not provided to the sink device, (ii) reconfiguring, in the source device, a video encoder operating on the plurality of video frames, such that an output bit rate of the video encoder is changed, or (iii) changing, in the source device, a video format of the video stream.

In some embodiments, the method includes one or more of the following features.

Based on the measure of network congestion, skipping one or more, but not all, video frames of the plurality of video frames in the video stream, such that the one or more video frames are not provided to the sink device.

Based on the measure of network congestion, reconfiguring the video encoder operating on the plurality of video frames, such that the output bit rate of the video is changed.

Reconfiguring the video encoder includes increasing a quantization parameter of the video encoder.

Determining the measure of network congestion includes determining that the network has been congested for at least a threshold period of time.

In response to determining that the network has been congested for at least a threshold period of time, at least one of (i) reducing a refresh rate of the video stream, or (ii) reducing a resolution of the video stream.

The at least one of (i) reducing a refresh rate of the video stream, or (ii) reducing a resolution of the video stream, includes causing one or more Real Time Streaming Protocol (RTSP) messages to be sent to the sink device, and wherein the one or more RTSP messages are messages used to renegotiate video format.

Receiving link quality information includes receiving information indicating at least one of (i) a number of packets dropped, (ii) a reason that one or more packets were dropped, or (iii) a current throughput.

Receiving the link quality information includes receiving, from a wireless local area network (WLAN) interface in the source device, the link quality information at one or more application processors that are (i) in the source device and (ii) external to the WLAN interface.

In another embodiment, a source device is operable to provide, via a wireless channel, a video stream to a sink device for display by the sink device. The source device includes a wireless network interface configured to communicate with the sink device via the wireless channel, and a video encoder configured to encode video data of the video stream to generate compressed video data. The compressed video data is generated at an output bit rate. The source device also includes one or more application processors configured to receive, from the wireless network interface, link quality information indicative of at least one of (i) a condition of the wireless channel, or (ii) performance of communications between the source device and the sink device via the wireless channel, determine a measure of network congestion based on the link quality information, and based on the measure of network congestion, at least one of (i) skip one or more, but not all, video frames of a plurality of video frames in the video stream, such that the one or more video frames are not provided to the sink device, (ii) reconfigure a video encoder operating on the plurality of video frames, such that an output bit rate of the video encoder is changed, or (iii) change a video format of the video stream.

In some embodiments, the source device includes one or more of the following features.

The one or more application processors are configured to, based on the measure of network congestion, skip one or more, but not all, video frames of the plurality of video frames in the video stream such that the one or more video frames are not provided to the sink device.

The one or more application processors are configured to, based on the measure of network congestion, reconfigure the video encoder to reduce the output bit rate.

The one or more application processors are configured to reconfigure the video encoder at least by increasing a quantization parameter of the video encoder.

The one or more application processors are configured to determine the measure of network congestion at least by determining whether the network has been congested for at least a threshold period of time, and when the one or more application processors determine that the network has been congested for at least the threshold period of time, at least one of (i) reduce a refresh rate associated with the video stream, or (ii) reduce a resolution of the video stream.

The one or more application processors are configured to, when the one or more application processors determine that the network has been congested for at least the threshold period of time, at least one of (i) reduce a refresh rate associated with the video stream, or (ii) reduce a resolution of the video stream, at least by causing one or more Real Time Streaming Protocol (RTSP) messages to be sent to the sink device, wherein the one or more RTSP messages are messages used to renegotiate video format.

The one or more application processors are configured to receive link quality information at least by receiving information indicating at least one of i) a number of packets dropped, ii) a reason that one or more packets were dropped, or iii) a current throughput.

In another embodiment, a method is implementable in a source device, wherein the source device is operable to provide, via a wireless network, a video stream to a sink device for display by the sink device. The method includes receiving, in the source device, queue information indicative of a length of one or more queues. The one or more queues hold video data corresponding to at least a portion of the video stream. The method also includes determining, in the source device and based on the queue information, that a queue length is above a threshold length. The queue length is associated with at least one of the one or more queues. The method also includes, in response to determining that the queue length is above the threshold length, reducing a queue load by one or both of (i) causing, in the source device, some or all video data currently in at least one of the one or more queues to be dropped, and (ii) dropping, in the source device, video data not yet in any of the one or more queues.

In some embodiments, the method includes one or more of the following features.

Reducing the queue load includes, in response to determining that the queue length is above the threshold length, dropping video data not yet in any of the one or more queues until a new Group of Pictures (GOP) begins.

Receiving queue information includes receiving, from a wireless local area network (WLAN) interface in the source device, queue information at one or more application processors that are (i) in the source device and (ii) external to the WLAN interface.

In another embodiment, a source device is operable to provide, via a wireless network, a video stream to a sink device for display by the sink device. The source device includes a wireless network interface configured to communicate with the sink device via the wireless network. The wireless network interface includes a queuing unit associated with one or more queues. The one or more queues hold video data corresponding to at least a portion of the video stream. The source device also includes one or more application processors configured to receive, from the wireless network interface, queue information indicative of a length of the one or more queues, and determine whether a queue length is above a threshold length. The queue length is associated with at least one of the one or more queues. The one or more application processors are also configured to, when the one or more application processors determine that the queue length is above the threshold length, reduce a queue load by one or both of (i) causing some or all video data currently in at least one of the one or more queues to be dropped, and (ii) dropping video data not yet in any of the one or more queues.

In some embodiments, the source device includes one or more of the following features.

The one or more application processors are configured to reduce the queue load at least by, when the one or more application processors determine that the queue length is above the threshold length, dropping video data not yet in any of the one or more queues until a new Group of Pictures (GOP) begins.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method implementable in a source device, wherein the source device is operable to provide, via a wireless channel, a video stream to a sink device for display by the sink device, the method comprising:
   receiving, at a processor of the source device, link quality information from a wireless local area network (WLAN) interface of the source device, the link quality information indicative of at least one of (i) a condition of the wireless channel, or (ii) performance of communications between the source device and the sink device via the wireless channel, wherein the processor implements application layer functions and is external to the WLAN interface;
   determining, at the processor of the source device, a measure of network congestion based on the link quality information;
   based on the measure of network congestion,
      in response to detecting network congestion, reconfiguring, with the processor of the source device, a video encoder operating on the plurality of video frames, such that an output bit rate of the video encoder is changed, and
      in response to determining network congestion has continued for at least a threshold period of time, changing, with the processor of the source device, a video format of the video stream, including at least one of (i) reducing a refresh rate of the video stream, or (ii) reducing a resolution of the video stream; and
   in response to receiving a message from the sink device that the sink device did not correctly receive a particular I-frame in the video stream, causing, with the processor, the WLAN interface to retransmit the particular I-frame.

2. The method of claim 1, further comprising:
   based on the measure of network congestion, skipping one or more, but not all, video frames of the plurality of video frames in the video stream, such that the one or more video frames are not provided to the sink device.

3. The method of claim 1, further comprising:
   based on the measure of network congestion, reconfiguring the video encoder operating on the plurality of video frames, such that the output bit rate of the video is changed.

4. The method of claim 3, wherein reconfiguring the video encoder includes increasing a quantization parameter of the video encoder.

5. The method of claim 1, wherein the at least one of (i) reducing a refresh rate of the video stream, or (ii) reducing a resolution of the video stream, includes causing one or more Real Time Streaming Protocol (RTSP) messages to be sent to the sink device, and wherein the one or more RTSP messages are messages used to renegotiate video format.

6. The method of claim 1, wherein receiving link quality information includes receiving information indicating at least one of (i) a number of packets dropped, (ii) a reason that one or more packets were dropped, or (iii) a current throughput.

7. A source device operable to provide, via a wireless channel, a video stream to a sink device for display by the sink device, the source device comprising:
   a wireless network interface configured to communicate with the sink device via the wireless channel;
   a video encoder configured to encode video data of the video stream to generate compressed video data, wherein the compressed video data is generated at an output bit rate; and
   one or more application processors configured to
      receive, from the wireless network interface, link quality information indicative of at least one of (i) a condition of the wireless channel, or (ii) performance of communications between the source device and the sink device via the wireless channel,
      a measure of network congestion based on the link quality information, and
      based on the measure of network congestion,
         in response to detecting network congestion, reconfigure a video encoder operating on the plurality of video frames, such that an output bit rate of the video encoder is changed, and
         in response to determining network congestion has continued for at least a threshold period of time, change a video format of the video stream, including at least one of (i) reducing a refresh rate of the video stream, or (ii) reducing a resolution of the video stream;
   wherein the one or more application processors are further configured to, in response to receiving a message from the sink device that the sink device did not correctly receive a particular I-frame in the video stream, cause the wireless network interface to retransmit the particular I-frame.

8. The source device of claim 7, wherein the one or more application processors are configured to:
 based on the measure of network congestion, skip one or more, but not all, video frames of the plurality of video frames in the video stream such that the one or more video frames are not provided in the sink device.

9. The source device of claim 7, wherein the one or more application processors are configured to:
 based on the measure of network congestion, reconfigure the video encoder to reduce the output bit rate.

10. The source device of claim 9, wherein the one or more application processors are configured to:
 reconfigure the video encoder at least by increasing a quantization parameter of the video encoder.

11. The source device of claim 7, wherein the one or more application processors are configured to:
 in response to the one or more application processors determining that the network has been congested for at least the threshold period of time, cause one or more Real Time Streaming Protocol (RTSP) messages to be sent to the sink device, wherein the one or more RTSP messages are messages used to renegotiate video format.

12. The source device of claim 7, wherein the one or more application processors are configured to:
 receive link quality information at least by receiving information indicating at least one of i) a number of packets dropped, ii) a reason that one or more packets were dropped, or iii) a current throughput.

\* \* \* \* \*